(No Model.) 2 Sheets—Sheet 1.
J. F. MALLINCKRODT.
CAR BRAKE.
No. 303,740. Patented Aug. 19, 1884.
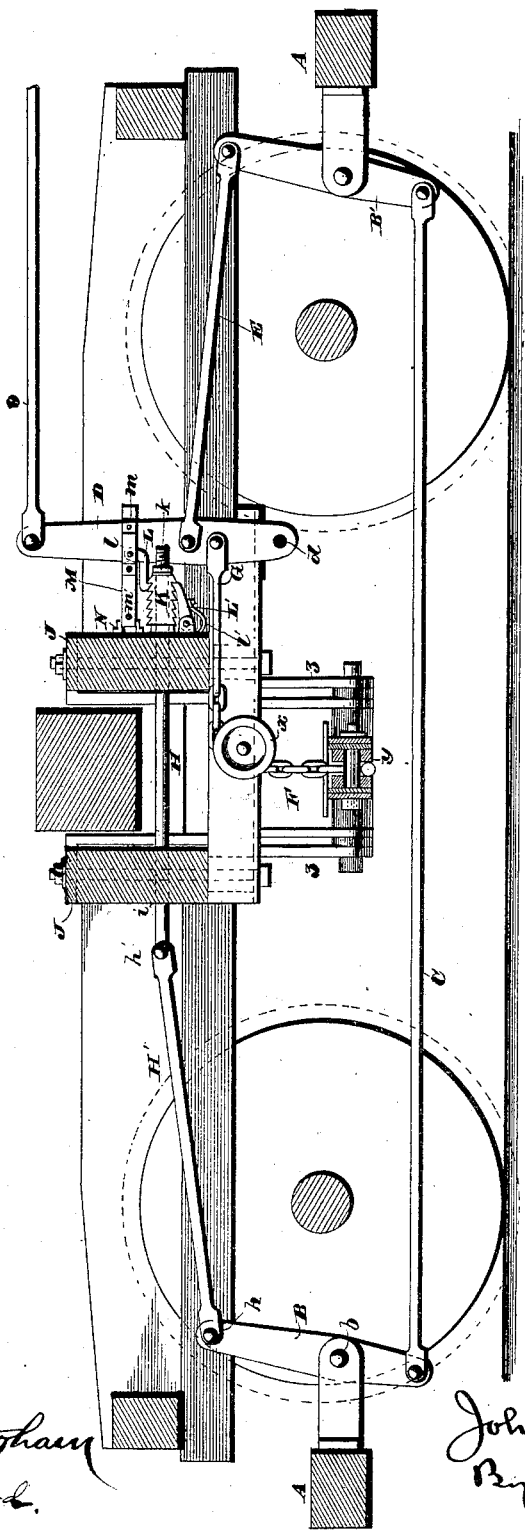

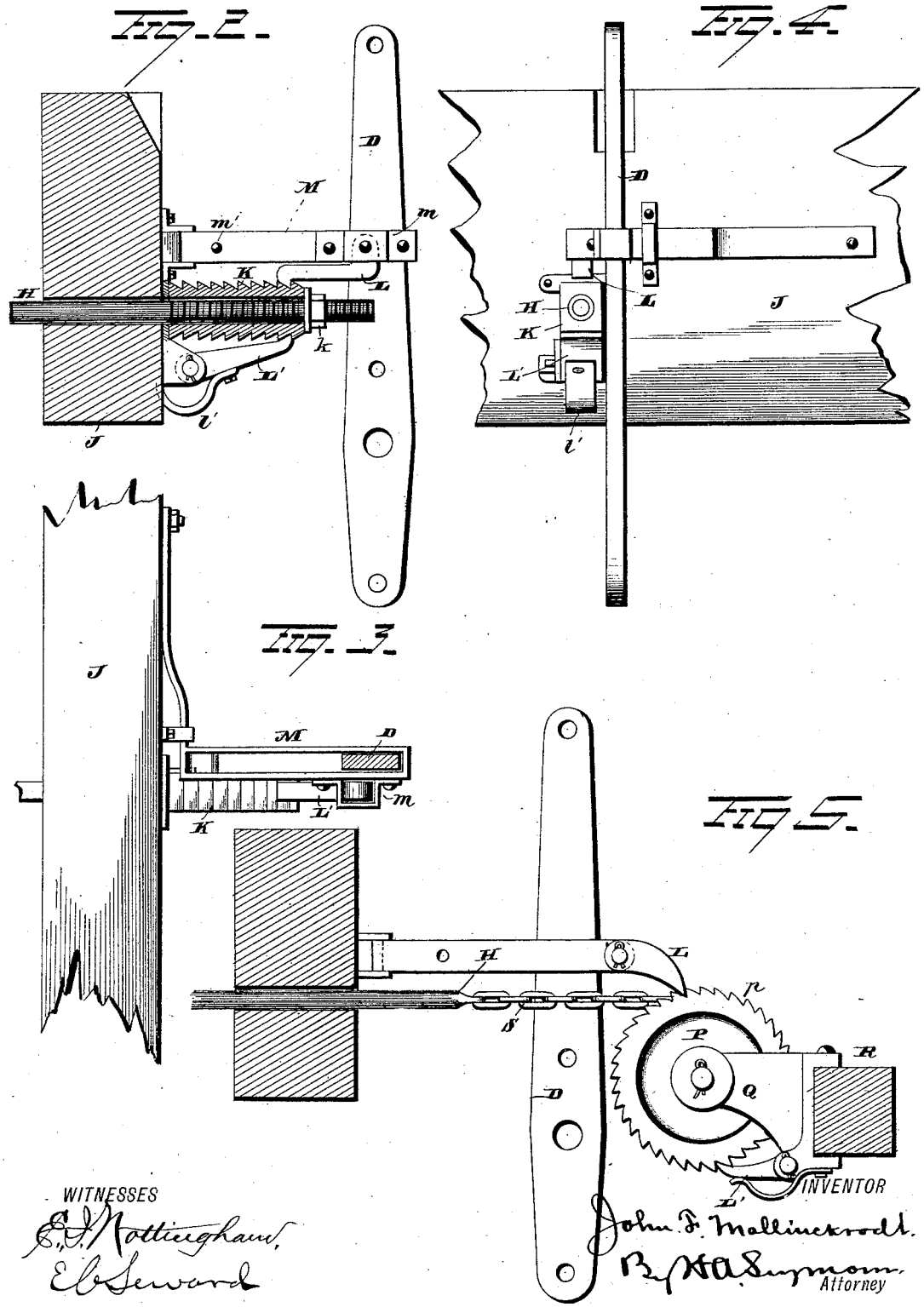

UNITED STATES PATENT OFFICE.

JOHN F. MALLINCKRODT, OF ST. LOUIS, MISSOURI, ASSIGNOR TO THE MALLINCKRODT BRAKE COMPANY, OF EAST ST. LOUIS, ILL.

CAR-BRAKE.

SPECIFICATION forming part of Letters Patent No. 303,740, dated August 19, 1884.

Application filed January 22, 1884. (No model.)

*To all whom it may concern:*

Be it known that I, JOHN F. MALLINCKRODT, of St. Louis, in the county of St. Louis and State of Missouri, have invented certain new and useful Improvements in Car-Brakes; and I do hereby declare the following to be a full, clear, and exact description of the invention, such as will enable others skilled in the art to which it appertains to make and use the same.

My invention relates to an improvement in car-brakes, the object being to provide improved mechanism whereby the slack occasioned by the wear of the shoes or wheels shall be automatically taken up.

With this end in view my invention consists in a ratchet secured to the braking mechanism, and devices constructed and arranged to engage the ratchet, and thereby automatically take up the slack and hold the brake-shoes in position to do their work most effectively.

My invention further consists in certain features of construction and combinations of parts, as will be fully described, and pointed out in the claims.

In the accompanying drawings, Figure 1 represents a car truck and brake mechanism in side elevation embodying my invention. Fig. 2 is an enlarged view of the slack-adjuster, partly in vertical section. Fig. 3 is a plan view, and Fig. 4 is an end view. Fig. 5 is a modification.

In the accompanying drawings the slack-adjuster is shown in connection with an improved truck and braking mechanism; but I do not limit my present invention to the application of it to any particular truck or braking mechanism, as it may readily be applied to any of the trucks and brakes in common use. The brake-beams A are suspended from the truck-frame in the usual manner, and are provided with suitable shoes. These beams A are constructed to be drawn toward each other, and thereby press the shoes against the wheels by means of the levers B B', pivoted at $b$, as shown, and connected by the rod C, pivoted to their lower ends, the lever D, pivoted to the truck at $d$, and connected with lever B' and the operating-chain F by the rods E and G, respectively, pivoted thereto, and the holdback-rod H H', pivoted to B at $h$. The sections H H' of the holdback-rod are pivotally secured together at $h'$, and the section H is held horizontally in position by passing through perforations $i$ in the cross-beams J, in which perforations the said section is allowed a sliding motion. The rod-section H is provided with the sleeve K, preferably square or oblong in cross-section, having ratchet-teeth on its upper and lower surfaces and secured on the rod by the nut $k$, or other suitable device. Two pawls, L and L', are secured in positions to engage, respectively, the upper and lower series of teeth on the sleeve K. The pawl L is pivoted in the frame $l$, the latter being secured to the elongated loop $m$, formed at the end of a spring-bar, M. The spring-bar M is rigidly secured to the cross-beam J at one end, and is retained in a horizontal position by a staple, N, which embraces it near the loop $m$, and enters the cross-beam J. The bar M has sufficient lateral play in the staple N to allow the pawl L to advance one tooth on the upper ratchet. The elongated loop $m$ embraces the upright lever D, before mentioned, and is provided with a pin or bolt, $m'$, secured transversely across the loop and constructed to arrest the forward motion of the lever D in the loop. The pawl L' is pivoted in suitable bearings secured to the cross-beam J underneath the sleeve K, and is held in contact with the ratchet on the under side of the sleeve by the band-spring $l'$. The chain F, passing over the roller $x$, is fastened to the bar $y$, the latter being secured in depending arms $z$. By means of the arms $z$, the bar $y$, the chain F, and suitable mechanism connected therewith, the particular construction of which forms no part of my present invention, the weight of the car and its load is exerted upon the lever D.

In Fig. 1 the brakes are represented as off. Now, when the rod O, attached to the upper end of the lever D, is released, the weight of the car, and its load will draw the lever D to the left, or toward the cross-beams, thereby causing the brake-beams A to approach and the shoes to hug the wheels. If the shoes are new or not worn, the lever D will not move far enough to the left to engage the bolt $m'$; but as soon as the shoes or wheels, or both combined, have become sufficiently worn to allow the pawl L to advance one tooth on the ratchet, the lever D, when the brakes are put on, will engage the bolt $m'$ and move the spring-bar M, and thereby the pawl L, to the left sufficient to allow the pawl to take a tooth in advance, and when the brakes are taken off the lever D, being forced to the right, engages the end of the loop $m$ and draws the holdback-rod H H' one tooth of the ratchet to the right, where it is held by the retaining-pawl L'. The effectiveness of the brakes will thus continue undiminished until the shoes are worn out.

The modification represented in Fig. 5 consists in a cylinder, P, provided with a ratchet-wheel, $p$, rigidly secured on the axle of the cylinder, the cylinder being journaled in the arms of a bracket, Q, secured to a cross-beam, R. The ratchet-wheel $p$ is constructed to be rotated and held in position by the pawls L and L', respectively, in a manner similar to that already described with reference to the sleeve K, the section H of the holdback-rod terminating in this case in the chain S, attached to the cylinder P.

It is evident that many slight changes may be made in the form and arrangements of the several parts herein described without departing from the spirit and scope of my invention; hence I do not wish to limit myself strictly to the description herein set forth.

Having fully described my invention, what I claim as new, and desire to secure by Letters Patent, is—

1. In a slack-adjuster for railroad-car brakes, the combination, with the lever D, operated in one direction by the weight of the car and in the opposite direction by the rod O, of braking mechanism and a slack-adjuster connected to the braking mechanism and operated by the said lever.

2. In a slack-adjuster for railroad-car brakes, the combination, with the lever D, operated in one direction by the weight of the car and in the opposite direction by the rod O, of braking mechanism, a ratchet connected with the braking mechanism, and a pawl operated by the lever D.

3. In a slack-adjuster for railroad-car brakes, the combination, with the lever D and a ratchet connected with the braking mechanism, of a movable pawl operated by the lever D, and a retaining-pawl for holding the ratchet in the required adjustment.

4. In a slack-adjuster for railroad-car brakes, the combination, with the lever D, the holdback-rod, and a braking mechanism, of a ratchet secured to the holdback-rod, a movable pawl operated by the lever D, and a retaining-pawl for holding the ratchet in the required adjustment, substantially as set forth.

5. The combination, with a braking mechanism and a ratchet connected therewith, of a spring-bar provided with a pawl for engaging the ratchet and operated by the braking mechanism, and a retaining-pawl for holding the ratchet in the required adjustment.

6. The combination, with the lever D, braking mechanism connected therewith, and the ratchet, of a spring-bar operated by the lever D, a pawl secured to said spring-bar, and a retaining-pawl for holding the ratchet in the required adjustment.

7. The combination, with the lever D, braking mechanism connected thereto, and a ratchet-faced sleeve secured to the holdback-rod of said braking mechanism, of a movable pawl for automatically engaging the ratchet-faced sleeve, and thereby compensating for the wear of the brake-shoes, substantially as set forth.

8. In a car-brake, the combination, with brake-shoes, the lever D, intermediate connections, and the ratchet-faced sleeve secured to the holdback-rod of the braking mechanism, of a pawl operated by the lever D, and a retaining-pawl, substantially as set forth.

9. In a car-brake, the combination, with the brake-shoes, lever D, intermediate connections, and the ratchet-faced sleeve, of the spring-bar operated by the lever D, a pawl pivoted to said spring-bar, and the retaining-pawl, substantially as set forth.

In testimony whereof I have signed this specification in the presence of two subscribing witnesses.

JOHN F. MALLINCKRODT.

Witnesses:
 FRANK E. NEVINS,
 C. D. GREENE, Jr.